(12) United States Patent
Sugiyama et al.

(10) Patent No.: US 9,981,595 B2
(45) Date of Patent: May 29, 2018

(54) VEHICLE LAMP

(71) Applicant: Koito Manufacturing Co., Ltd., Tokyo (JP)

(72) Inventors: Yuji Sugiyama, Shizuoka (JP); Teppei Muramatsu, Shizuoka (JP); Yoshinao Daicho, Shizuoka (JP); Kazuma Mochizuki, Shizuoka (JP); Tetsuya Ishida, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 22 days.

(21) Appl. No.: 15/407,409

(22) Filed: Jan. 17, 2017

(65) Prior Publication Data

US 2017/0210279 A1    Jul. 27, 2017

(30) Foreign Application Priority Data

Jan. 27, 2016  (JP) .................................. 2016-013364

(51) Int. Cl.
  *B60Q 1/14*    (2006.01)
  *F21S 8/10*    (2006.01)
  *H05B 33/08*   (2006.01)
  *F21Y 115/10*  (2016.01)

(52) U.S. Cl.
  CPC ......... *B60Q 1/1407* (2013.01); *B60Q 1/1438* (2013.01); *F21S 48/115* (2013.01); *F21S 48/1768* (2013.01); *H05B 33/0842* (2013.01); *F21Y 2115/10* (2016.08)

(58) Field of Classification Search
  USPC ...................................... 315/77–84
  See application file for complete search history.

(56) References Cited

U.S. PATENT DOCUMENTS 5,272,441 A * 12/1993 Wright .................... F16H 61/12
                                                  324/418

FOREIGN PATENT DOCUMENTS

JP        2014-056745 A    3/2014

* cited by examiner

*Primary Examiner* — Douglas W Owens
*Assistant Examiner* — Jianzi Chen
(74) *Attorney, Agent, or Firm* — Abelman, Frayne & Schwab

(57) ABSTRACT

Provided is a vehicle lamp including an optical unit including an optical element and a solenoid that drives the optical element; and a driving circuit configured to receive a voltage from a DC power supply and apply a driving voltage to the solenoid. The driving circuit includes a signal generating circuit that generates a notification signal indicating whether or not the solenoid is open-circuited. The signal generating circuit generates a first signal as the notification signal when the solenoid is normal. The notification signal is set as a second signal that is different from the first signal when open-circuit of the solenoid is detected.

13 Claims, 3 Drawing Sheets

VEHICLE LAMP

CROSS-REFERENCE TO RELATED APPLICATIONS

This application is based on and claims priority from Japanese Patent Application No. 2016-013364, filed on Jan. 27, 2016 with the Japan Patent Office, the disclosure of which is incorporated herein in its entirety by reference.

TECHNICAL FIELD

The present disclosure relates to a technical field of a vehicle lamp that includes an optical unit including an optical element and a solenoid that drives the optical element, and a driving circuit that receives a voltage from a DC power supply and applies a driving voltage to the solenoid in the optical unit.

BACKGROUND

For example, Japanese Patent Laid-Open Publication No. 2014-056745 discloses a vehicle lamp including an optical unit configured to switch between a low beam and a high beam and irradiate the beams. In this case, the optical unit includes an optical element as a movable shade to implement the switching between the low beam and the high beam, and a solenoid that drives the optical element. In addition, the vehicle lamp includes a driving circuit that receives a voltage from an in-vehicle battery (DC power supply) and applies a driving voltage to the solenoid in the optical unit.

SUMMARY

In the vehicle lamp that is capable of switching between the low beam and the high beam as described above, when open-circuit occurs in the solenoid, the optical element for the low beam/high beam switching does not work in the original operating state. Thus, the light distribution state becomes different from the intended light distribution state. For example, in a configuration in which the high beam irradiation is performed when the solenoid is turned ON and the low beam is irradiated when the solenoid is turned OFF, the vehicle lamp is not in the original high beam irradiation state, but in the low beam irradiation state.

At this time, as a so-called multi-lens head lamp, it is conceivable to adopt a configuration in which a plurality of optical units having a low beam/high beam switching function is provided. In this case, when a solenoid open-circuit occurs in any of the optical units, all the optical units should be in the high beam irradiation state, but only some of the optical units are in the low beam irradiation state. Thus, the entire light distribution state of the vehicle lamp becomes an incomplete high beam light distribution state.

Such an incomplete high beam light distribution state is undesirable for comfortably running at night. Therefore, in the above case, it is required to set all the optical units to be in the low beam irradiation state. At this time, since the ON/OFF control of the solenoids in the optical units is performed by an electronic control unit (ECU) on the vehicle side, the vehicle lamp is required to have a function of notifying the vehicle side of the open-circuit detection result of the solenoids.

Further, even though the notification function is implemented at this time, it is considered that the circuit related to the notification may encounter abnormality due to, for example, a failure. In that case, the vehicle side cannot be appropriately notified of the presence or absence of open-circuit. Thus, it is impossible to properly control the switching from the incomplete high beam irradiation state as described above to the low beam irradiation state.

The present disclosure has been made in consideration of the above circumstance, and an object of the present disclosure is to implement a vehicle lamp that is capable of appropriately performing the notification of the presence or absence of open-circuit of the solenoid in consideration of the abnormality of the circuit for notification.

A vehicle lamp according to the present disclosure includes: an optical unit including an optical element and a solenoid that drives the optical element; and a driving circuit configured to receive a voltage from a DC power supply and apply a driving voltage to the solenoid, in which the driving circuit includes a signal generating circuit that generates a notification signal indicating whether or not the solenoid is open-circuited, the signal generating circuit generates a first signal as the notification signal when the solenoid is normal, and the notification signal is set as a second signal that is different from the first signal when open-circuit of the solenoid is detected.

The proper use of the first signal and the second signal as described above makes it possible to notify the vehicle side of a fact that there is no abnormality in the circuit for the open-circuit notification, together with a fact that there is no open-circuit of the solenoid, according to the first signal, and finally, a fact that the vehicle is in a normal state where the vehicle is capable of generating the first signal without a failure. In other words, according to one of the second signals, the vehicle side may be notified that open-circuit of the solenoid is detected, or that the proper notification of the presence or absence of open-circuit is not possible due to abnormality of the circuit for notification.

In the above vehicle lamp according to the present disclosure, the first signal may be an oscillation signal that oscillates in a predetermined cycle, and the second signal may be a non-oscillation signal.

Therefore, notifying that open-circuit of the solenoid is detected, or that the proper notification of the presence or absence of open-circuit is not possible due to abnormality of the circuit for notification, may be implemented with a relatively simple configuration of providing the oscillation circuit.

In the above vehicle lamp according to the present disclosure, a plurality of the optical units may be provided, and the driving circuit may include a common feed line to supply the driving voltage to a plurality of the solenoids, and may perform an open-circuit detection of a plurality of the solenoids based on a feeding state of the common feed line.

Therefore, a circuit for the open-circuit detection is not necessarily provided for each solenoid.

In the above vehicle lamp according to the present disclosure, the driving circuit may include a common surge absorbing device connected in parallel to a plurality of the solenoids, and a reverse connection stop circuit inserted into the common feed line to a plurality of the solenoids.

Therefore, a surge absorbing device and a reverse connection stop circuit are not necessarily provided for each solenoid.

The above vehicle lamp according to the present disclosure may further include an additional beam irradiation unit configured to irradiate a region above a low beam with light.

Since the additional beam irradiation unit is provided separately from the optical unit, a degree of freedom in design may be facilitated to implement a desired beam distribution pattern.

In the above vehicle lamp according to the present disclosure, the optical unit may perform switching between a high beam irradiation state and a low beam irradiation state by driving or non-driving of the optical element.

Therefore, as a vehicle lamp having a switching and irradiation function of the high beam/low beam, it is possible to implement a vehicle lamp that is capable of appropriately performing the notification of the presence or absence of open-circuit of the solenoid in consideration of the abnormality of the circuit for notification.

According to the present disclosure, it is possible to implement a vehicle lamp that is capable of appropriately performing the notification of the presence or absence of open-circuit of the solenoid in consideration of the abnormality of the circuit for notification.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, descriptions will be made on a vehicle lamp 1 in an exemplary embodiment according to the present disclosure, with reference to FIGS. 1 and 2.

Figure 1:
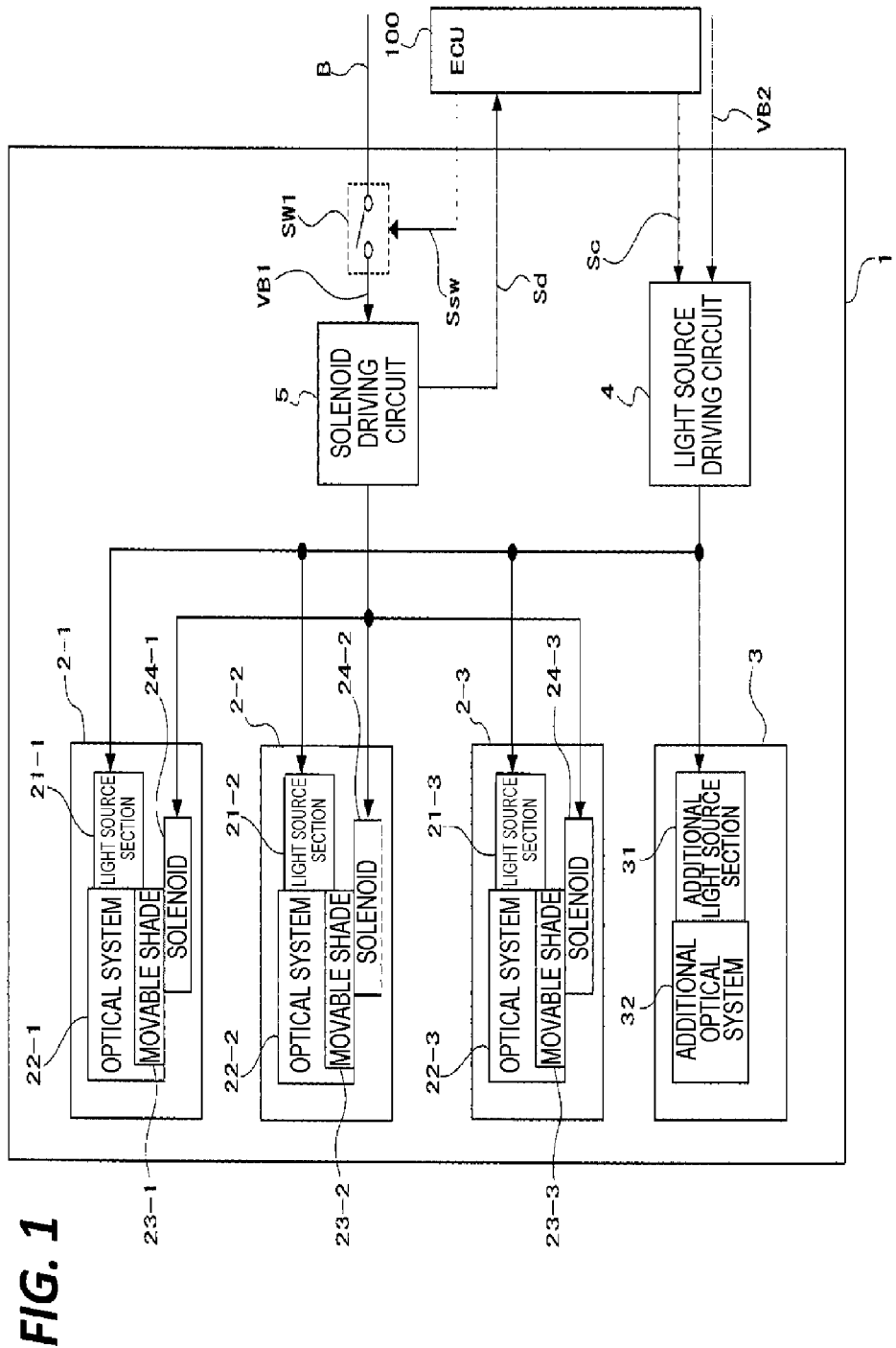
FIG. 1 is a block diagram illustrating a schematic configuration of a vehicle lamp of an exemplary embodiment.

FIG. 1 is a block diagram illustrating a schematic configuration of the vehicle lamp 1.

The vehicle lamp 1 is constituted with a pair of left and right head lamps disposed in the front end portion of the vehicle. The vehicle lamp 1 includes: a plurality of optical units 2 that is capable of switching between a low beam and a high beam; an additional beam irradiation unit 3 that irradiates a region above the low beam with light; a light source driving unit 4 that drives light source sections (including a light source section 21 and an additional light source section 31 to be described later), which are provided in the optical unit 2 and the additional beam irradiation unit 3, respectively, to emit light, based on a power supply voltage VB2 from an in-vehicle battery (not illustrated) as a power supply; a solenoid driving circuit 5 that drives solenoids 24 (to be described later) provided in the optical units 2; and a switch SW1.

The switch SW1 causes a battery voltage B from the in-vehicle battery to be ON/OFF depending on a control signal Ssw from an electronic control unit 100 provided on the vehicle side. When the switch SW1 is turned ON, a power supply voltage VB1 based on the battery voltage B is supplied to the solenoid driving circuit 5. An abnormality notification signal Sd (to be described later) is output from the solenoid drive circuit 5 to the ECU 100.

Here, although the ECU 100 is provided on the vehicle side in this exemplary embodiment, the ECU 100 may be provided on the vehicle lamp 1 side.

In the exemplary embodiment, the number of the optical units 2 is three (3), which are denoted as optical units 2-1, 2-2, and 2-3, respectively, in the following descriptions.

Each of the optical units 2 includes a light source section 21, an optical system 22 that irradiates the front of the vehicle with light generated from the light source section 21, and a solenoid 24 that drives a movable shade 23 provided in the optical system 22. In the drawing, the light source sections 21, the optical systems 22, the movable shades 23, and the solenoids 24 provided in the optical units 2-1, 2-2, 2-3 are denoted as light source sections 21-1, 21-2, 21-3, optical systems 22-1, 22-2, 22-3, movable shades 23-1, 23-2, 23-3, and solenoids 24-1, 24-2, 24-3, respectively, with a corresponding number at the end. Hereinafter, the light source sections 21, the optical system 22, the movable shades 23, and the solenoids 24 will be denoted with a number at the end of the reference numeral, as necessary.

In each of the optical units 2, the light source section 21 includes one or more light sources constituted with, for example, a light emitting diode (LED).

The optical system 22 includes, for example, a reflector that reflects the light generated from the light source section 21, or a projection lens. The optical system 22 projects (irradiates) the light from the light source section 21, including light reflected by the reflector, to the front of the vehicle through the projection lens. The movable shade 23 is disposed on an optical path in the optical system 22, and configured to be displaceable between a first state where a part of the light from the light source section 21 is shielded and a second state where the light is not shielded.

In the exemplary embodiment, the optical system 22 is configured such that the low beam irradiation state is obtained when the movable shade 23 is in the first state, and the high beam irradiation state is obtained when the movable shade 23 is in the second state.

In the exemplary embodiment, the movable shade 23 is biased to the first state, and thus, the low beam irradiation state is obtained when the solenoid 24 is in a non-driven state, and the high beam irradiation state is obtained when the solenoid 24 is in a driven state.

The solenoid 24 includes a coil (solenoid coils 24-1a to 24-3a to be described later), and a movable iron core (plunger) displaced based on the magnetic force corresponding to the magnetic field generated in the coil. The movable shade 23 is displaced from the first state to the second state based on the power obtained when the movable iron core is displaced.

The additional beam irradiation unit 3 includes an additional light source section 31 having one or more light sources (e.g., LEDs), and an additional optical system 32 that irradiates the front of the vehicle with light generated from the additional light source section 31. In the exemplary embodiment, the additional beam irradiation unit 3 is configured as a high beam irradiation unit that irradiates a high beam.

Here, in the vehicle, a low beam ON instruction or a high beam ON instruction is made based on the operation by an operator such as, for example, a driver. According to the low beam ON instruction, the ECU 100 causes the switch SW to be in the OFF state by the above-described control signal Ssw, and stops the supply of the power supply voltage VB1 to the solenoid driving circuit 5 so that the solenoids 24-1 to 24-3 are in the non-driven state and the movable shades 23-1 to 23-3 are in the first state. Further, at this time, the ECU 100 instructs the light source driving circuit 4 by the control signal Sc in the drawing to turn ON the light source sections 21-1 to 21-3 in each of the optical units 2 and turn OFF the additional light source section 31 in the additional beam irradiation unit 3.

According to the high beam ON instruction, the ECU 100 causes the switch SW to be in the ON state by the control signal Ssw so as to supply the power supply voltage VB1 to the solenoid driving circuit 5. Thus, the solenoids 24-1 to 24-3 are in the driven state, and the moving shades 23-1 to 23-3 are in the second state. Further, the ECU 100 instructs the light source driving circuit 4 by the control signal Sc to turn ON the light source sections 21-1 to 21-3 in each of the optical units 2 and the additional light source section 31 in the additional beam irradiation unit 3.

Figure 2:
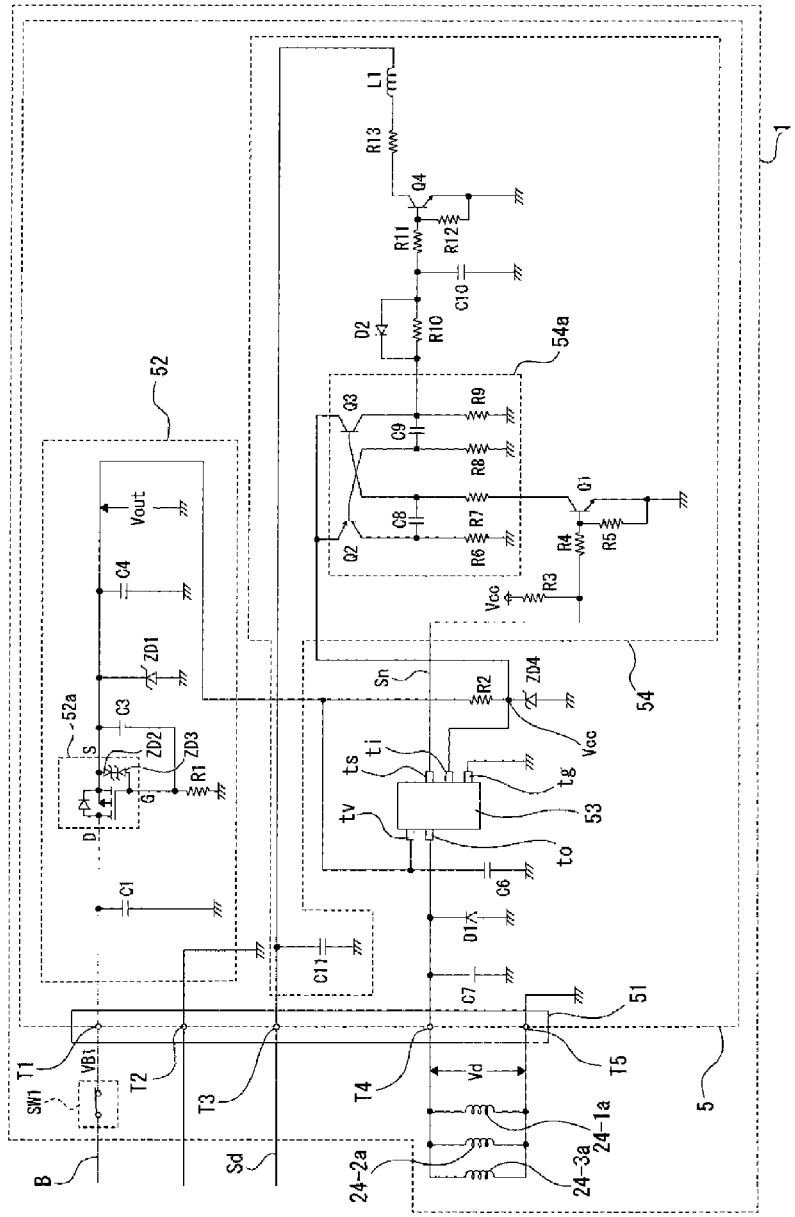
FIG. 2 is a view illustrating a circuit configuration of the vehicle lamp of the exemplary embodiment.

FIG. 2 is a view illustrating a circuit configuration of the vehicle lamp 1.

Further, among the circuit configuration of the vehicle lamp 1, FIG. 2 illustrates mainly a configuration according to the driving of the solenoids. Specifically, the solenoid coils 24-1a to 24-3a provided in the solenoids 24-1 to 24-3, the solenoid driving circuit 5, and the switch SW that performs a supply control to the solenoid driving circuit 5, are extracted and illustrated therein.

In FIG. 2, the solenoid driving circuit 5 includes a terminal section 51, a power supply filter 52, a driving integrated circuit (IC) 53, and a notification signal generating circuit 54.

The terminal section 51 includes positive and negative electrode side input terminals T1 and T2 that serve as input terminals of the power supply voltage VB1, a notification signal output terminal T3 that outputs an abnormality notification signal Sd (to be described later) to the vehicle side (the above-described in-vehicle ECU), and positive and negative electrode side output terminals T4 and T5 that output a driving voltage Vd to drive the solenoids 24-1 to 24-3.

The negative electrode side input terminal T2 and the negative electrode side output terminal T5 are grounded as illustrated.

The power supply filter 52 includes a condenser C1 inserted between a positive electrode side line (a connection line with the positive electrode side input terminal T1) and the earth, a reverse connection stop circuit 52a constituted with, for example, P channel type metal-oxide-semiconductor field-effect transistor (MOSFET), a resistor R1, a condenser C3, a Zener diode ZD1, and a condenser C4.

The positive electrode terminal of the condenser C1 is connected to the positive electrode terminal side input terminal T1, and the negative electrode terminal thereof is grounded. The condenser C1 functions as a noise filter for electrostatic countermeasure.

In the reverse connection stop circuit 52a, the drain of the MOSFET is connected to a connection point of the positive electrode terminal of the condenser C1 and the positive electrode side input terminal T1, the source is connected to a load side, and the gate is grounded via the resistor R1. A reverse connection circuit in which a Zener diode ZD2 and a Zener diode ZD3 are connected in reverse (cathodes are connected to each other) and a condenser C3 are connected in parallel between the gate and the source of the MOSFET.

The reverse connection circuit of the Zener diode ZD2 and the Zener diode ZD3 constitutes the reverse connection stop circuit 52a together with the MOSFET.

In the drawing, a parasitic diode (body diode) generated between the drain and the source of the MOSFET is illustrated.

In the reverse connection stop circuit 52a, when the in-vehicle battery is connected normally, the gate potential of the MOSFET is lower than the source potential. Thus, the MOSFET is in the ON state. That is, this enables the power supply to the load side based on the power supply voltage VB1 (battery voltage B). Meanwhile, when the in-vehicle battery is reversely connected, the gate potential of the MOSFET becomes higher than the source potential. Thus, the MOSFET is in the OFF state. At this time, the parasitic diode also becomes non-conductive. Therefore, the circuit is protected against the reverse connection of the power supply.

The configuration of the reverse connection stop circuit 52a is not limited to the above configuration. For example, the reverse stop circuit 52a may have another configuration in which the diode is inserted into the positive electrode side of the power supply voltage VB1 in a direction where the anode is connected to the positive electrode input terminal T1 side.

The reverse connection stop circuit 52a using the MOSFET as described above is advantageous in that the power loss in normal operation may be reduced as compared with a case where a diode is used.

The cathode of the Zener diode ZD1 is connected to a connection point of the source of the MOSFET and the condenser C3, and the anode is grounded. The Zener diode ZD1 has a function to protect the voltage of the MOSFET.

The condenser C4 is inserted between the earth and a connection point of the source of the MOSFET, the positive electrode terminal of the condenser C3, and the cathode of the Zener diode ZD1, and functions as a smoothing condenser. An output voltage Vout of the power supply filter 52 is obtained as a voltage between both ends of the condenser C4. In the exemplary embodiment, the output voltage Vout is set in, for example, a 12 V system.

The driving IC 53 outputs a driving voltage Vd to drive the solenoids 24-1 to 24-3 based on the output voltage Vout of the power supply filter 52, and has an abnormality detection function to detect an abnormality such as, for example, open-circuit of the solenoids 24-1 to 24-3 (load side open-circuit) or load short-circuit.

The driving IC 53 includes a power supply input terminal tv, an input terminal ti, an output terminal to, a ground terminal tg, and a detection signal terminal ts. The ground terminal tg is grounded.

The input terminal tv is an input terminal through which the driving IC 53 inputs operation power, and is connected to the positive electrode terminal of the condenser C4 so that the output voltage Vout is input. A condenser C6 is inserted between the power supply input terminal tv and the earth.

The input terminal ti is connected to the condenser C4 via a resistor R2, so that a Zener voltage (e.g., a 5 V system) by a Zener diode ZD4 (inserted in a direction where the anode side is grounded between the earth and the connection point of the input terminal ti and the resistor R2) is input. Hereinafter, the Zener voltage will be referred to as a "voltage Vcc."

The output terminal to is connected to the positive electrode side output terminal T4 in the terminal section 51. A condenser C7 is inserted between the positive electrode output terminal T4 and the earth.

The driving IC 53 outputs the output voltage Vout (DC voltage), which has been input from the power supply input terminal tv, from the output terminal to. Therefore, a driving voltage Vd is generated between the positive electrode side output terminal T4 and the negative electrode side output terminal T5 in the terminal section 51 to drive the solenoids 24-1 to 24-3.

The solenoids 24-1 to 24-3 are provided in different optical units 2 (see, e.g., FIG. 1), but the solenoid coils 24-1a to 24-3a provided in the solenoids 24-2 to 24-3 are connected in parallel on the circuit as illustrated in the drawing. Specifically, one end of each of the solenoid coils 24-1a to 24-3a is connected to a common line connected to the positive electrode side output terminal T4, and the other end is connected to a common line connected to the negative electrode side output terminal T5.

Therefore, the driving voltage Vd may be applied to each of the solenoid coils 24-1a to 24-3a.

Here, in the solenoid driving circuit 5 of the present exemplary embodiment, a diode D1 is inserted between the output terminal to of the driving IC 53 and the earth in a direction where the anode side is grounded. That is, the diode D1 is connected in parallel relation to each of the solenoid coils 24-1a to 24-3a.

The diode D1 functions as a diode for surge absorption when the power supply is turned OFF.

In the exemplary embodiment, since the solenoid coils 24-1a to 24-3a are connected in parallel as described above, it is not necessary to provide the diode D1 as a surge absorbing device for each of the solenoid coils 24-1a to 24-3a. Thus, only one diode D1 may be provided.

Further, the driving IC 53 performs an abnormality detection on the load side having the parallel connection circuit of the solenoid coils 24-1a to 24-3a as described above. Specifically, in the abnormality detection, it is determined whether or not the voltage value of the driving voltage Vd is decreased to a predetermined first threshold value (paired short-circuit) or less and whether or not the value is increased to a predetermined second threshold value (>the first threshold value) or higher (paired open-circuit). Then, when a positive result is obtained in any determinations, it is determined that there is an abnormality, and when a negative result is obtained in any determinations, it is determined that there is no abnormality.

The abnormality detection method is merely illustrative, and the abnormality detection may be performed based on the feeding state of the feed line to apply the driving voltage Vd.

The driving IC 53 outputs the detection result signal Sn indicating the result of the abnormality detection as described above to the notification signal generating circuit 54 via the detection signal terminal ts.

The notification signal generating circuit 54 generates a notification signal (an abnormality notification signal Sd in the exemplary embodiment) indicating the presence or absence of open-circuit of the solenoids 24-1 to 24-3 to be output to the vehicle side.

The notification signal generating circuit 54 includes a resistor R3, a resistor R4, a resistor R5, a transistor Q1, an oscillation circuit 54a, a resistor R10, a diode D2, a condenser C10, a resistor R11, a resistor R12, a transistor Q4, a resistor R13, an inductor L1, and a condenser C11.

The transistor Q1 is, for example, an NPN type bipolar transistor. The base thereof is connected to the detection signal terminal ts of the driving IC 53 via the resistor R4, the emitter is grounded, and the resistor R5 is inserted between the base and the emitter. Further, the base of transistor Q1 is connected to a voltage Vcc via a series-connected circuit of the resistor R4 and the resistor R3. One end of the resistor R3 is connected to a connection point of the resistor R4 and the detection signal terminal ts, and the other end is connected to the voltage Vcc.

As described below, the collector of the transistor Q1 functions as a control terminal to turn ON/OFF the operation of the oscillation circuit 54a.

In this exemplary embodiment, the oscillation circuit 54a is constituted with a multi-vibrator having two transistors Q2 and Q3.

In the exemplary embodiment, PNP type bipolar transistors are used as the transistors Q2, Q3. The emitter of each of the transistors Q2, Q3 is connected to the cathode of the Zener diode ZD4 as described above. The collector of the transistor Q2 is grounded via a resistor R6, and the collector of the transistor Q3 is grounded via a resistor R9. The base of the transistor Q2 is grounded via a resistor R8, and the base of the transistor Q3 is connected to the collector of the transistor Q1 via a resistor R7.

A condenser C8 is inserted between the connection point of the collector of the transistor Q2 and the resistor R6 and the connection point of the base of the transistor Q3 and the resistor R7. A condenser C9 is inserted between the connection point of the collector of the transistor Q3 and the resistor R8 and the connection point of the base of the transistor Q2 and the resistor R8.

In the exemplary embodiment, the collector of the transistor Q3 in the oscillation circuit Ma functions as an output terminal of the oscillation signal.

The collector of the transistor Q3 is connected to the base of the transistor Q4 formed of, for example an NPN type bipolar transistor via the series-connected circuit of the resistor R10 and the resistor R11. The resistor R10 is connected to the diode D2 in parallel in a direction where the cathode side thereof is connected to the collector of the transistor Q3, and the condenser C10 is inserted between the connection point of the resistor R10 and the resistor R11 and the earth.

The emitter of the transistor Q4 is grounded, and the resistor R12 is inserted between the base and the emitter. The collector of the transistor Q4 is connected to the notification signal output terminal T3 in the terminal section 51 via the series-connected circuit of the resistor R13 and the inductor L1. The condenser C11 is inserted between the notification signal output terminal T3 and the earth.

Descriptions will be made on an operation of the notification signal generating circuit 54 according to the above configuration.

First, in the exemplary embodiment, the driving IC 53 outputs an H level as the detection result signal Sn when the determination result of "there is no abnormality" is obtained, and outputs an L level when the determination result of "there is an abnormality" is obtained.

Therefore, in the normal state where no abnormality is determined, the transistor Q1 is turned ON in response to the detection result signal Sn being at the H level. When the transistor Q1 is turned ON, the transistor Q3 is turned ON in the oscillator circuit 54a, and the oscillation operation is started, in which the transistor Q3 and the transistor Q2 are repeatedly and alternately turned ON and OFF in a predetermined cycle. Thus, an oscillation signal according to the predetermined cycle is obtained in the collector of the transistor Q3.

The transistor Q4 is repeatedly turned ON and OFF in response to the oscillation signal, so that the abnormality notification signal Sd output via the notification signal output terminal T3 becomes an oscillation signal that oscillates in a predetermined cycle. In this case, the oscillation signal becomes a signal that cyclically repeats a GND potential (Low potential) and a high impedance.

Meanwhile, in the case of the abnormality (the abnormality on the solenoid side), when the detection result signal Sn is at the L level, the transistor Q1 is turned OFF, and thus, the oscillation operation by the oscillation circuit 54a is turned OFF. As a result, the abnormality notification signal Sd becomes a signal for maintaining the high impedance state.

The abnormality may be abnormality on the solenoid side, as well as on the notification signal generating circuit 54 side. When an abnormality occurs due to a certain factor (e.g., failure) and causes the operation stop of the notification signal generating circuit 54, the abnormality notification signal Sd becomes a signal for maintaining the high impedance state because the transistor Q1 is turned off similarly to the case of the abnormality on the solenoid side.

Further, an abnormality that is possibly generated in the entire supply path of the abnormality notification signal Sd to the ECU 100 may include an abnormality in which the notification signal output terminal T3 is grounded (becomes a GND potential). In this case, the abnormality notification signal Sd becomes a signal for maintaining the GND potential (Low potential).

The ECU 100 is able to determine the presence or absence of an abnormality of the solenoids 24-1 to 24-3 based on the difference in the signal state of the abnormality notification signal Sd as described above. Specifically, when the abnormality notification signal Sd is not in the oscillation state, a determination result of "there is an abnormality" is obtained. When it is determined that there is an abnormality in the solenoids 24-1 to 24-3, the ECU 100 turns OFF the supply of the power supply voltage VB1 to the solenoid driving circuit 5, and stops the application of the driving voltage Vd to the solenoid coils 24-1a to 24-3a, so that each of the optical units 2-1 to 2-3 is shifted to the low beam irradiation state. In addition, when it is determined that there is an abnormality in the solenoids 24-1 to 24-3, the ECU 100 also instructs the light source drive circuit 4 to turn OFF the additional light source unit 31 in the additional beam irradiation unit 3.

Therefore, in the vehicle lamp 1, a high beam irradiation is suppressed from being performed by an incomplete light distribution state due to open-circuit of at least one of the solenoids 24-1 to 24-3.

Based on the abnormality notification signal Sd, the ECU 100 may perform a determination about three states including the normal state, the abnormal state of any of the solenoid side and the notification signal generation circuit 54 side, and the abnormal state of the notification signal supply path (ground abnormality of the notification signal output terminal T3 described above).

Figure 3:
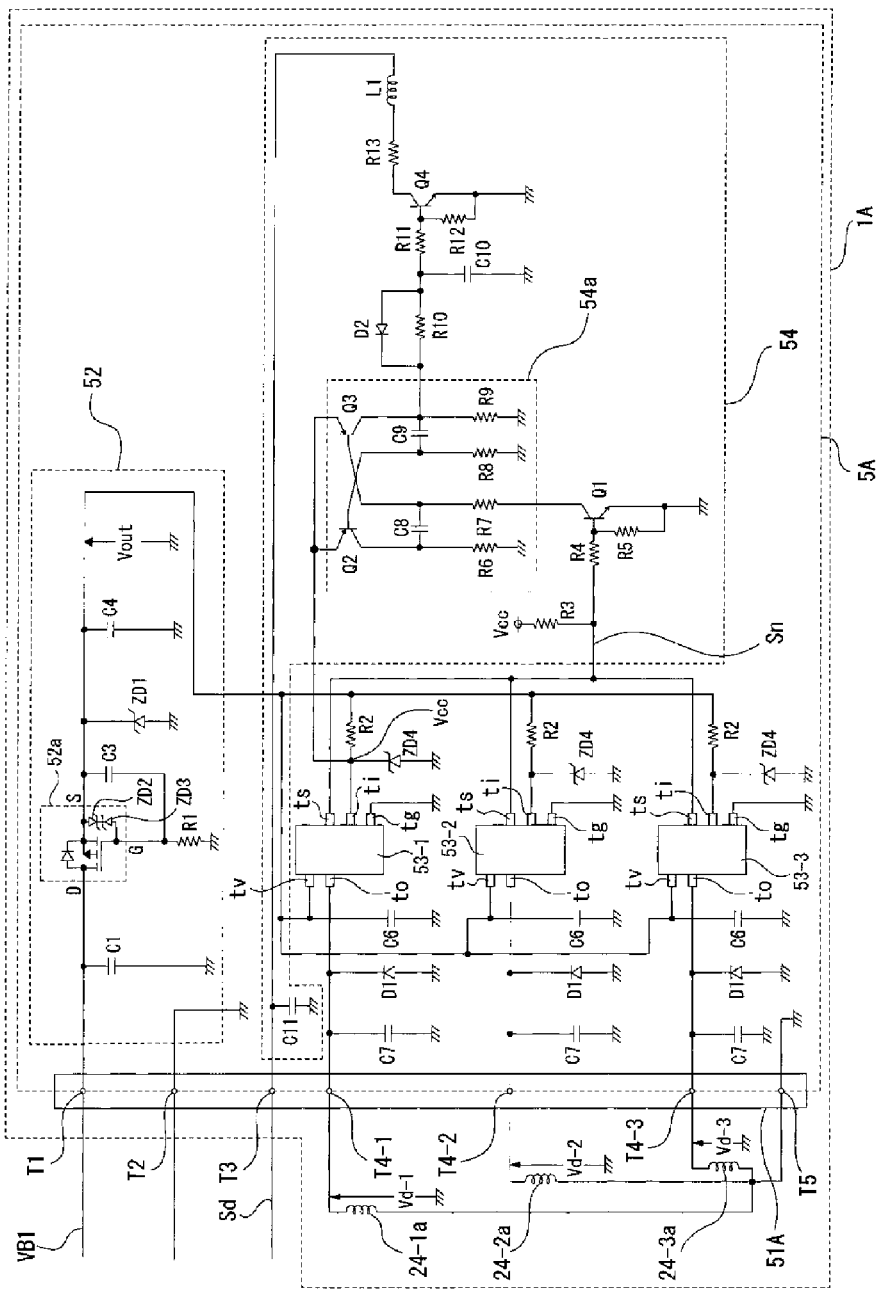
FIG. 3 is a view illustrating a circuit configuration of a vehicle lamp of a modification.

FIG. 3 is a view illustrating a circuit configuration of a vehicle lamp 1A in a modification. In FIG. 3, illustration of the switch SW1 is omitted.

The vehicle lamp 1A in the modification includes driving ICs 53 provided individually for each of the solenoid coils 24-1a to 24-3a.

As illustrated, the vehicle lamp 1A includes a solenoid driving circuit 5A in place of the solenoid driving circuit 5. In the solenoid driving circuit 5A, the driving ICs 53, which are provided individually, are denoted as driving ICs 53-1, 53-2, 53-2 by matching the numbers at the end with the corresponding solenoid coils 24.

In this case, a corresponding Zener diode ZD4 is inserted between the input terminal ti of each of the driving ICs 53-1, 53-2, 53-3 and the earth. In addition, a resistor R2 is inserted between the condenser C4 and each connection point of the input terminals ti and the Zener diodes ZD4. Therefore, the Zener voltage Vcc from the corresponding Zener diode ZD4 is input to each of the input terminals ti.

Further, the output voltage Vout is input to the power supply input terminal tv of each of the driving ICs 53-1 to 53-3 in the same manner as in the case of the driving IC 53 illustrated in FIG. 2 (the connection mode of the condenser C6 is also the same).

Further, in this case, a terminal section 51A is provided in place of the terminal section 51. The terminal section 51A is different from the terminal section 51 in that positive electrode side output terminals T4-1, T4-2, T4-3 are provided in place of the positive electrode side output terminal T4.

In this case, one end of the solenoid coil 24-1a is connected to the positive electrode side output terminal T4-1, and the other end is connected to the negative electrode side output terminal T5. One end of the solenoid coil 24-2a is connected to the positive electrode side output terminal T4-2, and the other end is connected to the negative electrode side output terminal T5. One end of the solenoid coil 24-3a is connected to the positive electrode side output terminal T4-3, and the other end is connected to the negative electrode side output terminal T5.

A parallel-connected circuit of the condenser C7 and the diode D1 for surge absorption is inserted between each of the positive electrode side output terminals T4-1, T4-2, T4-3 and each earth.

The driving IC 53-1 applies a driving voltage based on the output voltage Vout to the solenoid coil 24-1a via the positive electrode side output terminal T4-1. Similarly, the driving IC 53-2 applies a driving voltage based on the output voltage Vout to the solenoid coil 24-2a via the positive electrode side output terminal T4-2, and the driving IC 53-3 applies a driving voltage based on the output voltage Vout to the solenoid coil 24-3a via the positive electrode side output terminal T4-3.

Further, the detection signal terminal is of each of the driving ICs 53-1 to 53-3 is connected to the connection point of the resistor R3 and the resistor R4 in the notification signal generating circuit 54.

That is, in this case, as the abnormality notification signal Sd, an oscillation signal according to a predetermined cycle is output in the normal state of the solenoid coils 24-1 to 24-3 as in the case of the vehicle lamp 1. However, when an abnormality such as, for example, open-circuit, occurs in any one of the solenoid coils 24-1 to 24-3, a signal different from the oscillation signal (a signal for maintaining a high impedance state in this exemplary embodiment) is output.

In the vehicle lamp 1A of the modification as described above, since the driving IC 53 is provided individually for each of the solenoid coils 24-1a to 24-3a, the solenoid coils 24-1a to 24-3a may be driven by an individual driving voltage. This is advantageous, for example, when it is required to apply a driving voltage with a different voltage value to the solenoid coil 24-1a to 24-3a.

Further, since the driving IC 53 is provided individually for each of the solenoid coils 24-1a to 24-3a, the open-circuit detection may be performed individually for each of the solenoid coils 24-1a to 24-3a.

As described above, the vehicle lamp 1 or 1A includes: the optical unit 2 including the optical element (the movable shade 23) and the solenoid 24 that drives the optical element; and the driving circuit (solenoid driving circuit 5 or 5A)

configured to receive a voltage from the DC power supply and apply a driving voltage to the solenoid, in which the driving circuit includes the signal generating circuit 54 that generates a notification signal indicating whether or not the solenoid is open-circuited, the signal generating circuit generates a first signal as the notification signal when the solenoid is normal, and the notification signal is set as a second signal that is different from the first signal when open-circuit of the solenoid is detected.

The proper use of the first signal and the second signal as described above makes it possible to notify the vehicle side of a fact that there is no abnormality in the circuit for the open-circuit notification, together with a fact that there is no open-circuit of the solenoid, according to the first signal, and finally, a fact that the vehicle is in a normal state where the vehicle is capable of generating the first signal without a failure. In other words, according to one of the second signals, the vehicle side may be notified that open-circuit of the solenoid is detected, or that the proper notification of the presence or absence of open-circuit is not possible due to abnormality of the circuit for notification.

Accordingly, it is possible to implement a vehicle lamp that is capable of appropriately performing the notification of the presence or absence of open-circuit of the solenoid in consideration of the abnormality of the circuit for notification.

Further, in the vehicle lamp according to the exemplary embodiment, the first signal is set as an oscillation signal that oscillates in a predetermined cycle, and the second signal is set as a non-oscillation signal.

Therefore, notifying that open-circuit of the solenoid is detected, or that the proper notification of the presence or absence of open-circuit is not possible due to abnormality of the circuit for notification, may be implemented with a relatively simply configuration of providing the oscillation circuit.

Thus, it is possible to reduce the number of circuit components, suppress increase in size of the circuit, and reduce the cost in order to implement the notification.

Further, in the vehicle lamp 1 according to the exemplary embodiment, a plurality of the optical units is provided, and the driving circuit includes a common feed line to supply the driving voltage to a plurality of the solenoids, and performs an open-circuit detection of a plurality of the solenoids based on a feeding state of the common feed line.

Therefore, a circuit for the open-circuit detection is not necessarily provided for each solenoid.

Thus, it is possible to suppress increase in size of the circuit and reduce the cost by reducing the number of components.

Further, in the vehicle lamp 1 according to the exemplary embodiment, the driving circuit includes the common surge absorbing device (the diode D1) connected in parallel to a plurality of the solenoids, and the reverse connection stop circuit 52a inserted into the common feed line to a plurality of the solenoids.

Therefore, a surge absorbing device and a reverse connection stop circuit are not necessarily provided for each solenoid.

Thus, it is possible to suppress increase in size of the circuit and reduce the cost by reducing the number of components.

Further, the vehicle lamp according to the exemplary embodiment further includes the additional beam irradiation unit 3 configured to irradiate a region above a low beam with light.

Since the additional beam irradiation unit is provided separately from the optical unit, a degree of freedom in design may be facilitated to implement a desired beam distribution pattern.

Further, in the vehicle lamp according to the exemplary embodiment, the optical unit performs switching between a high beam irradiation state and a low beam irradiation state by driving or non-driving of the optical element.

Therefore, as a vehicle lamp having a switchover irradiation function of the high beam/low beam, it is possible to implement a vehicle lamp that is capable of appropriately performing the notification of the presence or absence of open-circuit of the solenoid in consideration of the abnormality of the circuit for notification.

As illustrated in FIG. 2, in a configuration in which a common driving voltage Vd is output to a connection circuits of a plurality of solenoid coils 24a, a plurality of solenoid coils 24a are connected in parallel. However, the plurality of solenoid coils 24a may be connected in series rather than in parallel. In the case of the series connection, open-circuit of one solenoid 24 causes the other solenoids 24 to be automatically turned OFF. Thus, a need for the open-circuit detection may be eliminated. However, in the case of the series connection, since the voltage applied to individual solenoid coils 24a varies depending on the number of solenoid coils 24a to be connected, it may be necessary to use solenoids 24 having different specifications depending on the number of optical units 2 provided in the vehicle lamp 1.

On the other hand, in the case of the parallel connection, since the voltage applied to each solenoid coil 24a is able to be kept constant regardless of the number of the solenoid coils 24a, it is possible to use solenoids 24 having a common specification regardless of the number of optical units 2 provided in the vehicle lamp 1.

The present disclosure is not limited to the exemplary embodiments described above.

In the above descriptions, for example, the present disclosure is applied to a vehicular head lamp. However, the present disclosure may be appropriately applied to other vehicle lamps in addition to the head lamp.

Further, in the above descriptions, the optical element is configured as a movable shade to switch between the low beam irradiation state and the high beam irradiation state. However, the optical element may take other forms, for example, which allow the light distribution state to be switched between a predetermined first state and a predetermined second state.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicle lamp comprising:
   an optical unit including an optical element and a solenoid that drives the optical element; and
   a driving circuit configured to receive a voltage from a DC power supply and apply a driving voltage to the solenoid,
   wherein the driving circuit is configured to detect whether or not the solenoid is open-circuited and includes a signal generating circuit configured to generate notification signal indicating whether or not the solenoid is open-circuited based on a detection result at the driving circuit, the signal generating circuit generates a first signal as the notification signal when it is detected that the solenoid is not open-circuited, and the signal generating circuit generates a second signal as the notification signal when it is detected that the solenoid is open-circuited, and the second signal is different from the first signal.

2. The vehicle lamp of claim 1, wherein the first signal is an oscillation signal that oscillates in a predetermined cycle, and the second signal is a non-oscillation signal.

3. The vehicle lamp of claim 2, wherein a plurality of optical units is provided, and the driving circuit includes a common feed line to supply the driving voltage to a plurality of solenoids in the plurality of optical units, and performs an open-circuit detection of the plurality of solenoids based on a feeding state of the common feed line.

4. The vehicle lamp of claim 3, wherein the driving circuit includes:

a common surge absorbing device connected in parallel to the plurality of solenoids; and a reverse connection stop circuit inserted into the common feed line to the plurality of solenoids.

5. The vehicle lamp of claim 4, further comprising:

an additional beam irradiation unit configured to irradiate a region above a low beam with light.

6. The vehicle lamp of claim 2, further comprising:

an additional beam irradiation unit configured to irradiate a region above a low beam with light.

7. The vehicle lamp of claim 3, further comprising:

an additional beam irradiation unit configured to irradiate a region above a low beam with light.

8. The vehicle lamp of claim 1, wherein a plurality of optical units is provided, and the driving circuit includes a common feed line to supply the driving voltage to a plurality of solenoids in the plurality of optical units, and performs an open-circuit detection of the plurality of solenoids based on a feeding state of the common feed line.

9. The vehicle lamp of claim 8, wherein the driving circuit includes:

a common surge absorbing device connected in parallel to the plurality of solenoids; and a reverse connection stop circuit inserted into the common feed line to the plurality of solenoids.

10. The vehicle lamp of claim 9, further comprising:

an additional beam irradiation unit configured to irradiate a region above a low beam with light.

11. The vehicle lamp of claim 8, further comprising:

an additional beam irradiation unit configured to irradiate a region above a low beam with light.

12. The vehicle lamp of claim 1, further comprising:

an additional beam irradiation unit configured to irradiate a region above a low beam with light.

13. The vehicle lamp of claim 1, wherein the optical unit performs switching between a high beam irradiation state and a low beam irradiation state by driving or non-driving of the optical element.

\* \* \* \* \*